UNITED STATES PATENT OFFICE.

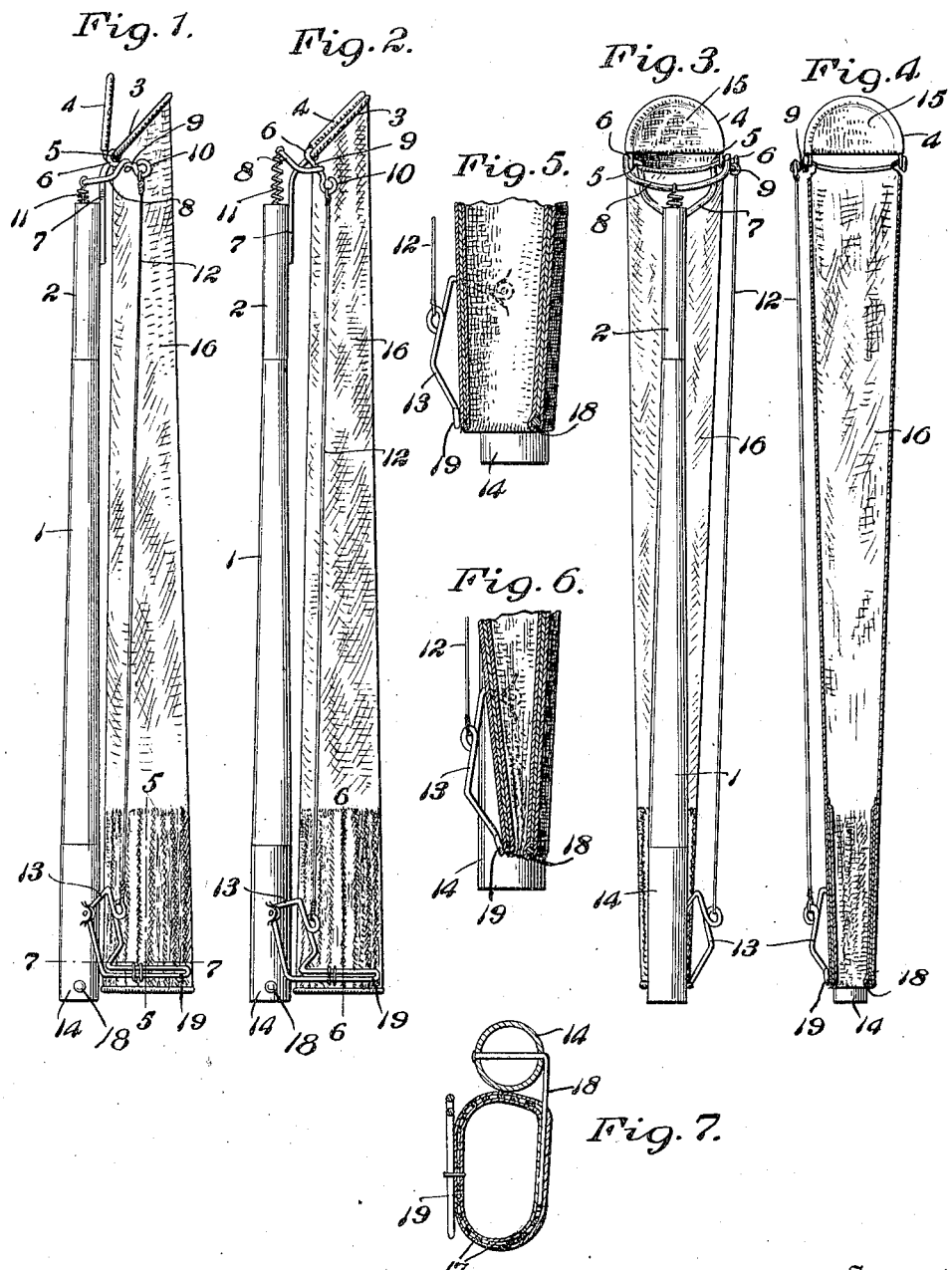

THOMAS M. McGRAIL AND JOHN W. RENFRO, OF CENTRALIA, WASHINGTON; MINERVA E. RENFRO ADMINISTRATRIX OF SAID JOHN W. RENFRO, DECEASED.

FRUIT-PICKER.

999,389.  Specification of Letters Patent.  Patented Aug. 1, 1911.

Application filed June 23, 1910. Serial No. 568,524.

*To all whom it may concern:*

Be it known that we, THOMAS M. Mc-GRAIL and JOHN W. RENFRO, citizens of the United States, residing at Centralia, in the county of Lewis and State of Washington, have invented certain new and useful Improvements in Fruit-Pickers; and we do declare the following to be a full, clear, and exact description of the invention, such as will enable others skilled in the art to which it appertains to make and use the same.

This invention relates to improvements in fruit pickers.

The object of the invention is to provide a fruit picker having an improved means whereby the fruit is severed from the limbs without shaking off other fruit and means whereby the severed fruit is conducted to a suitable receptacle without bruising.

With this and other objects in view, the invention consists of certain novel features of construction, combination and arrangement of parts as will be more fully described and particularly pointed out in the appended claims.

In the accompanying drawings: Figure 1 is a side view of a fruit picker constructed in accordance with the invention showing the picking jaws in open position; Fig. 2 is a similar view showing the picking jaws in closed position; Fig. 3 is a similar view taken at right angles to Figs. 1 and 2; Fig. 4 is a vertical longitudinal section of the same. Fig. 5 is a sectional view of the lower end of the fruit conducting chute on the line 5—5 of Fig. 1 showing the lower end thereof open; Fig. 6 is a similar view on the line 6—6 of Fig. 2 showing the lower end closed; Fig. 7 is a horizontal view through the lower end of the device on the line 7—7 of Fig. 1.

Referring more particularly to the drawings, 1 denotes the handle of the picker, said handle being of any desired length and having secured to its upper end a ferrule 2. Secured to the ferrule 2 and projecting above the same is the stationary member 3 of a pair of picking jaws the movable member 4 of which is pivotally connected to the stationary member as shown. The members 3 and 4 of the picking jaws are preferably constructed of wire of sufficient size to provide the necessary strength for the jaws. The outer portions of the jaws 3 and 4 are preferably bent into the form of bail shaped fruit gripping jaws and the stationary jaw 3 is bent inwardly at the inner end of the bail shaped portion to form bearings 5 with which are pivotally engaged bearing eyes 6 formed in the movable member 4 as shown. The ends of the wire forming the stationary member 3 of the jaws after being bent to form the bearings 5 are bent inwardly and joined together to form the attaching shank 7 of said jaw member which is rigidly secured to the ferrule 2 in any suitable manner. The wire forming the movable jaw 4, after being bent to form the bearing eyes 6, is extended to form a loop 8 and the ends of the wire are twisted together at one side of the jaw and bent to form a crank arm 9 having at its outer end an eye or hook 10.

To the loop 8 is connected the upper end of a jaw closing spring 11 which extends down into the ferrule 2 and has its lower end secured in the latter in any suitable manner. The tension of the spring when thus arranged is exerted to open the movable jaw and to hold the same at open position.

To the eye or hook 10 in the outer end of the crank arm 9 is connected the upper end of a jaw closing wire or cord 12, the lower end of which is connected to a suitable operating handle 13 which is in the form of an open frame pivotally connected at its upper end to a ferrule 14 secured to the lower end of the handle 1 as shown. When the handle frame 13 is pulled downwardly the movable jaw 4 will be closed into tight engagement with the stationary jaw thus firmly gripping the stem of the fruit engaged by the jaws so that by a slight twisting the fruit will be severed from the branch without shaking off other fruit.

The movable jaw 4 is preferably covered with a suitable fabric 15 while to the stationary jaw 3 is connected the upper end of a fruit conducting chute 16 which extends downwardly to the lower end of the handle 1 as shown. In the lower end of the chute 16 is arranged a series of flexible ribs 17 which may be formed of thin spring or elastic strips of metal or other suitable material which are secured in casings or pockets formed in the lower end of the chute as shown. In order to catch the fruit at the lower end of the chute, after the same has been severed by the picking jaws, and thus break the fall of the fruit whereby the latter is prevented from being bruised or otherwise injured, we provide a pair of chute closing jaws arranged at the lower end of the chute and comprising a fixed chute holding member 18 which is secured at its inner end in the ferrule 14 and projects laterally at right angles thereto into a hem formed in the lower end of the chute as shown. The opposite or movable member 19 of the chute closure is preferably formed on and as a part of the frame handle 13 and attached to the chute by stitches as clearly shown in Figs. 1 and 2. It will thus be seen that when the handle 13 is vibrated to move the jaw 4 to or from the jaw 3, the chute closing member 19 will be simultaneously moved to or from the member 18. The movement of the member 19 toward the member 18 will close the end of the chute, as shown in Fig. 6, while the separation of said members will spread the lower end of the chute as shown in Fig. 5, so that when a fruit has been severed by the picking jaws it will drop through the chute into the lower end thereof where it will be caught by the portion of the chute containing the spring ribs and its fall thus broken so that it will not be bruised or injured. After thus picking and catching the fruit, the operating handle is released and the spring 11 thus permitted to open the picking jaws and simultaneously open the chute closing jaws so that the fruit will drop out into a basket or other suitable receptacle at the same time that the gripping jaws open to engage a second fruit.

It will be noted that the handle or frame 13 is pivoted at its upper end to the support or main handle 1 and is arranged substantially parallel with the pivots of the fruit picking jaws, while the chute closing jaw 19 extends from the lower end of the handle at a right angle thereto. When the spring 11 raises the jaw 4, the connection 12 will be drawn upward and the handle or lever 13, consequently, swung upward on its pivot. This movement of the handle 13 will cause an outward movement of the lower end thereof which will necessarily be followed by the jaw 19 and will carry it upward and outward from the jaw 18 so as to distend the chute. When the handle or lever 13 is swung downwardly the jaw 19 will move in the opposite direction, to compress the fabric of the chute against the jaw 11, and a downward pull will be exerted through the cord 12 upon the movable fruit gripping jaw to bring it to closed position.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described our invention what we claim is:

1. In a fruit picker, the combination of a support, fruit gripping jaws at the upper end thereof, a chute depending from said jaws, a chute closing member fixed in the support and extending into and secured in the lower end of the chute, an operating handle pivotally mounted on the support and having an extension attached to the chute to coöperate with the fixed chute closing member, and connections between said handle and the fruit gripping jaws.

2. In a fruit picker, the combination of a support, a pair of fruit picking jaws operatively mounted on the upper end of said support, a chute connected to said jaws to receive fruit therefrom, a series of flexible longitudinal ribs arranged in the chute at the lower end of the same, a pair of co-acting chute-closing members mounted on the lower end of the support and connected to the chute, and a connection between one of said members and one of the fruit gripping jaws whereby they will be simultaneously operated.

3. In a fruit picker, the combination of a support, a pair of picking jaws arranged on the upper end thereof, said jaws comprising a stationary member secured to the upper end of the support, a movable member pivotally mounted on said stationary member, a crank arm on said movable member, and a spring secured to said member to hold the same normally in open position, a chute depending from said stationary member, a chute-closing member provided with an operating handle pivoted on the lower end of the support and attached to the chute, a connection between said handle and the said crank arm, and a chute closing member fixed to and extending from the support and attached to the chute in position to coöperate with the first-mentioned chute-closing member.

4. In a fruit picker, a main handle, a pair of picking jaws operatively mounted on the upper end of said handle, a flexible fruit conducting chute secured at its upper end to said picking jaws, a series of flexible ribs arranged in the lower end of said chute whereby the fruit dropping into said end is prevented from being bruised, a pair of chute closing members arranged in the lower end of said handle, said members comprising a stationary member and a movable member suitably connected with the opposite sides of the chute and adapted to be brought together to close the lower end of the latter, means to connect the movable member of said chute closing jaws with the movable member of the fruit picking jaws whereby said pairs of jaws may be closed in unison, and a spring to simultaneously open said pairs of jaws.

In testimony whereof we have hereunto set our hands in presence of two subscribing witnesses.

THOMAS M. McGRAIL.
JOHN W. RENFRO.

Witnesses:
MILES McGRAIL,
JOHN EAVENS.

Copies of this patent may be obtained for five cents each, by addressing the "Commissioner of Patents, Washington, D. C."